Apr. 24, 1923.                                                              1,453,032
GRAF ALFRED VON SODEN-FRAUNHOFEN
CHANGE SPEED GEAR
Filed May 3, 1920
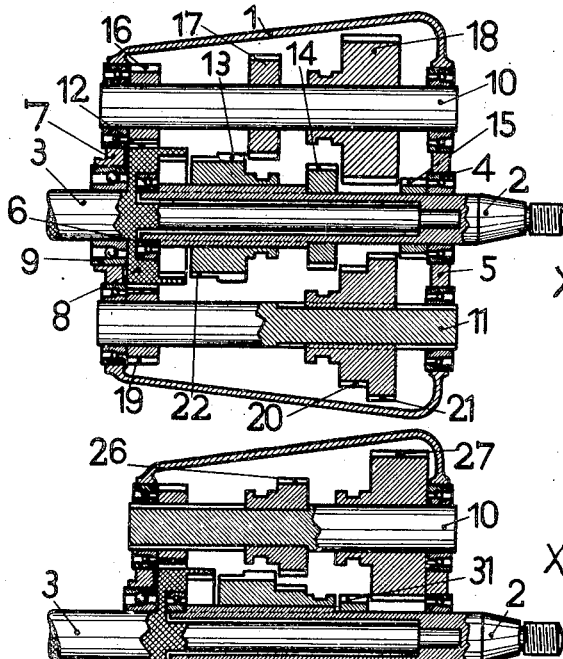
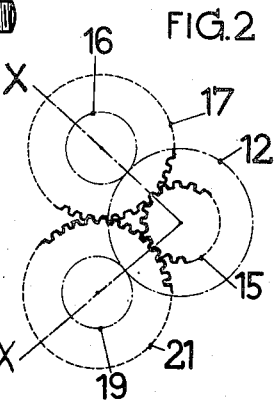
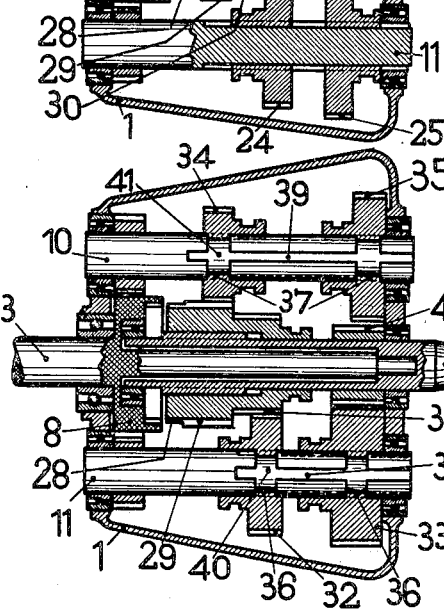
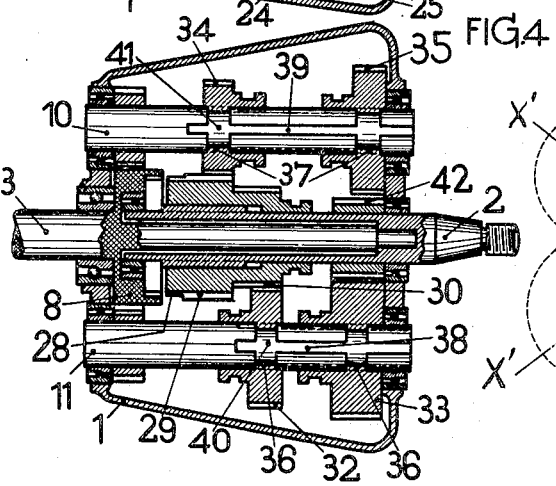
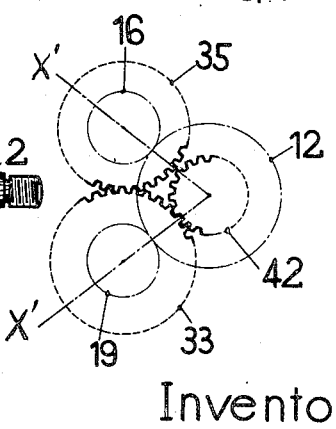
Inventor:
Graf Alfred von
Soden-Fraunhofen.

Patented Apr. 24, 1923.

1,453,032

UNITED STATES PATENT OFFICE.

GRAF ALFRED VON SODEN-FRAUNHOFEN, OF FRIEDRICHSHAFEN, GERMANY.

CHANGE-SPEED GEAR.

Application filed May 3, 1920. Serial No. 378,234.

*To all whom it may concern:*

Be it known that I, Graf ALFRED VON SODEN-FRAUNHOFEN, a citizen of the German Empire, residing at Friedrichshafen, Germany, have invented certain new and useful Improvements in Change-Speed Gears (for which I have filed applications in Germany September 23, 1918, No. 10,597, and Switzerland August 18, 1919, No. 1,068), of which the following is a specification.

My invention relates to change speed gears and more especially to the arrangement of the gear wheels and shafts in change speed gears for use in motor vehicles. Its principal object is to construct such gears in as compact a manner as possible so that they take up a minimum of room both as regards length and breadth. A further object is to make the single shafts cooperate as uniformly as possible in the transmission of power, to render them easily accessible and to provide that the striker rods can easily be mounted.

In the change speed gear according to the present invention this aim is attained by distributing the gear wheels designed to cooperate with the wheels on the main shaft evenly over two intermediate shafts. A gear comprising four speeds and a reverse will thus require only four wheels on the main shaft and three wheels on each intermediate shaft. In the preferred form the intermediate shafts extend at an at least approximately equal distance laterally of a plane of symmetry passing through the main shaft and are therefore equidistant from the main shaft. In a device of this kind the greatest compactness can be obtained provided that the intermediate shafts, besides gearing with the main shaft, can also be brought to gear or are gearing with each other by aid of one pair of gear wheels each.

The control sleeves can easily be disposed of without increasing the length of the gear. If it is desired to throw each speed in and out by a separate striker rod, this can be effected in the simplest manner by arranging two control sleeves on each intermediate shaft and one on the main shaft. If only three striker rods shall be used, one striker rod is preferably provided for each shaft.

As the two intermediate shafts are nearly equal a wheel fixed on each of said shafts can with advantage be kept in gear with a fixed wheel on the main shaft. The reverse is obtained in the simplest way, without having recourse to a fourth shaft, by causing a wheel of one of the intermediate shafts to gear not only with a wheel on the main shaft but also with a wheel on the other intermediate shaft. In order to render the gear still more effective with regard both to construction and working I prefer recessing the grooved intermediate shafts for the temporary release of the gear wheels displaceable thereon and permanently gearing with each other at the respective places to an extent corresponding to the depth of the claws and to the length of the different gear wheels.

In the drawings affixed to this specification and forming part thereof three different forms of a change speed gear according to the present invention are illustrated in which Fig. 1 is a longitudinal section on the lines $x$—$x$ (Fig. 2) passing through all the shafts of a change speed gear provided with three control sleeves, while Fig. 2 is a front elevation illustrating the true relative position of the three shafts and the way in which the wheels are gearing with each other.

Fig. 3 is a longitudinal section as shown in Fig. 1 of a change speed gear comprising five control sleeves.

Fig. 4 is a similar longitudinal section and

Fig. 5 is a front elevation of a third form.

Referring to the drawings, four ahead speeds and a reverse are provided in each case. 1 is the casing and 2 is the motor shaft and 3 the Cardan shaft coaxial therewith, both arranged in the plane of symmetry of said casing. The part of the motor shaft 2 which extends through the casing is hollow and is supported with one end in a bearing 4 in the front wall 5 of the casing while its other end is supported by a ball bearing 6 disposed near the other front wall 7 in a flange 8 formed on the Cardan shaft 3. This latter shaft is supported by a bearing 9 arranged in the wall 7 of the casing, its free end extending into the interior of the hollow motor shaft 2 and being supported therein in the plane of the front wall 5 of the casing. 10 and 11 are the intermediate shafts extending through the casing in parallel with and equally distanced apart from the main or motor shaft 2, which carries four gear wheels 12, 13, 14, 15, while three wheels 16, 17, 18 and 19, 20, 21 respectively are arranged on each intermediate shaft. The largest wheel 12 on the main shaft formed in one piece with the flange 8 of the Cardan shaft is permanently gearing with the intermediate wheels 16 and 19 of equal size fixed on the intermediate shafts 10 and 11. The flange 8 further forms the stationary part of a claw coupling cooperating with the movable part 22 integral with the gear wheel 13 and axially displaceable on longitudinal keys provided on the middle portion of the main shaft 2. The smallest gear wheel 15 is keyed to the main shaft near the front wall 5 of the casing.

In all three modifications illustrated in the drawings the throwing in and out of the different speeds is effected by aid of striker rods (not shown) and control sleeves, three rods being provided in the first modification and five each in the second and third one. In the gears shown in Figs. 1 and 3 all those wheels which are not designed for permanent power transmission are out of gear as long as they are in their position of rest, while in the gear illustrated in Fig. 4 all the wheels arranged in pairs are permanently gearing with each other, but are free to rotate relatively to the intermediate shafts 10 and 11 whenever they are at rest. In all three cases the wheels are shown in the positions they are holding when all five speeds are thrown out. Intermediate shaft 11 carries the wheels 20 and 21 for the first and second speeds, while on intermediate shaft 10 there are arranged the wheels 17 and 18 for the third speed and the reverse respectively.

In the modification shown in Fig. 1 the wheels 20, 21 for the first and second are formed in one piece and are adapted to be displaced axially on the grooved shaft 11 in both directions so as to come in gear either with wheel 14 or with wheel 15, both arranged on the motor shaft 2. The movable part 22 of the claw coupling is displaceable as well in either direction on the grooved motor shaft 2. It may either couple directly the shafts 2 and 3 by entering the flange 8 or it may cause the gear wheel 13 to come in gear with the wheel 17 for the third speed keyed to shaft 10. The reverse wheel 18, loose on shaft 10 and permanently gearing with the largest wheel 21 on shaft 11, on being shifted from its position of rest comes in gear with the wheel 15 on the motor shaft 2 and in that case reverses the direction of rotation of shaft 11.

In the modification illustrated in Fig. 3 intermediate shaft 11 carries two separately displaceable wheels 24 and 25 for the first and second speeds respectively. In a like manner wheel 26 is free to be shifted on intermediate shaft 10 which is grooved at this point, while the reverse wheel 27 is again permanently loose on the shaft. Part 28 of the coupling displaceable on the portion provided with longitudinal keys of the motor shaft 2 carries two rims of gear wheels 29 and 30 adapted to come in gear with the wheels 24 and 26 respectively. According to whether one of the wheels 24, 25, 26, coupling 28 or wheel 27 is shifted to the left, either the first or the second, third or fourth speed or the reverse is thrown in. As the number of teeth on wheels 25 and 27 is equal the speeds of the first and the reverse are equal.

The change speed gear illustrated in Fig. 4 substantially differs from the one described before therein that the wheels 32, 33, 34 are permanently in gear with their corresponding wheels and are free, same as the reverse wheel 35 to turn relatively to the shafts 10 and 11 whenever they are in their position of rest, while being coupled therewith on being thrown in. To this effect each one of the wheels aforementioned is provided with four inwardly directed claws 36 and 37 respectively serving to guide the said wheel in longitudinal grooves 38 and 39 and in circular grooves 40 and 41 respectively, these latter permitting the wheels to turn while they are in the position of rest. As the wheels on being thrown in cannot turn about their shafts, the claws 36 and 37 may be much shorter than the teeth of the wheels. The reverse wheel 35 is permanently turned by the wheel 33 which is permanently gearing with the wheel 42 and for this reason its diameter is such that its turning movement will not influence the wheel 42.

I claim:

1. In a device of the kind described in combination, a main shaft and two intermediate shafts extending at substantially equal distances from said main shaft, said three shafts being disposed in the corners of a triangle, gear wheels on said main shaft and a plurality of axially displaceable wheels distributed over said intermediate shafts, the number of displaceable wheels being the same on both intermediate shafts.

2. In a device of the kind described in combination, a main shaft and two intermediate shafts extending at substantially equal distances from said main shaft, said three shafts being disposed in the corners of a triangle, gear wheels on said main shaft, a plurality of axially displaceable wheels distributed over said intermediate shafts, the number of displaceable wheels being the same on both intermediate shafts and a pair of gear wheels on said intermediate shafts adapted to couple said shafts with said main shaft as well as with one another.

3. In a device of the kind described in combination, a main shaft and two grooved intermediate shafts extending at substantially equal distances from said main shaft, said three shafts being disposed in the corners of a triangle, gear wheels on said main shaft, a plurality of axially displaceable wheels distributed over said intermediate shafts, a pair of gear wheels on said intermediate shafts adapted to couple said shafts with said main shaft as well as one another, annular recesses on said grooved intermediate shafts and claws extending inwardly from the hub of the gear wheels into the grooves of said shafts and fitting also in said recesses.

In testimony whereof I affix my signature.

Graf ALFRED von SODEN-FRAUNHOFEN.